(12) United States Patent
Li (10) Patent No.: US 11,698,691 B2
(45) Date of Patent: Jul. 11, 2023

(54) SCROLL WHEEL MODULE AND MOUSE

(71) Applicant: Guangdong Ruixun Electronic Technology Co.,Ltd., Guangdong Province (CN)

(72) Inventor: Jianping Li, Guangdong Province (CN)

( * ) Notice: Subject to any disclaimer, the term of this patent is extended or adjusted under 35 U.S.C. 154(b) by 216 days.

(21) Appl. No.: 17/420,386

(22) PCT Filed: Dec. 29, 2020

(86) PCT No.: PCT/CN2020/000332
§ 371 (c)(1),
(2) Date: Jul. 1, 2021

(87) PCT Pub. No.: WO2021/207865
PCT Pub. Date: Oct. 21, 2021

(65) Prior Publication Data
US 2023/0152909 A1    May 18, 2023

(30) Foreign Application Priority Data

Apr. 14, 2020 (CN) .......................... 202010290754.0

(51) Int. Cl.
 G06F 3/038 (2013.01)
 G06F 3/0354 (2013.01)
 G06F 3/0362 (2013.01)
(52) U.S. Cl.
 CPC ............ G06F 3/038 (2013.01); G06F 3/0362 (2013.01); G06F 3/03543 (2013.01)

(58) Field of Classification Search
 CPC ..... G06F 3/038; G06F 3/03543; G06F 3/0362
 See application file for complete search history.

(56) References Cited

U.S. PATENT DOCUMENTS

| | | | | |
|---|---|---|---|---|
| 2003/0151594 A1* | 8/2003 | Tsai | ..................... | H01H 25/008 345/163 |
| 2004/0239629 A1* | 12/2004 | Koo | ...................... | G06F 3/0362 345/163 |
| 2007/0146324 A1* | 6/2007 | Blandin | ................ | G06F 3/0362 345/163 |
| 2009/0122012 A1* | 5/2009 | Bohn | .................. | G06F 3/03543 345/163 |
| 2013/0027308 A1* | 1/2013 | Peng | ................... | G06F 3/03543 345/163 |

(Continued)

Primary Examiner — Ariel A Balaoing
(74) Attorney, Agent, or Firm — Prakash Nama; Global IP Services, PLLC (57) ABSTRACT

The present invention discloses a scroll wheel module, which comprises a bracket and a rotatable scroll wheel that is arranged on the bracket. The scroll wheel is equipped with a hand feel member that provides flipping tactile. The scroll wheel module further comprises an electronic control adjustment assembly, which is used to adjust the magnitude of damping that the hand feel member exerts on the scroll wheel. By tactfully combining the electronic control adjustment assembly with the hand feel member, the present application can adjust the height of the tilting end simply and quickly by means of the electronic control adjustment assembly, further adjust the distance between the hand feel end of the hand feel member and the inner ring of the scroll wheel, and finally manage to adjust different kinds of tactile sense about the damping while rolling the scroll wheel.

8 Claims, 5 Drawing Sheets

(56) References Cited

U.S. PATENT DOCUMENTS

| | | | |
|---|---|---|---|
| 2013/0321272 A1* | 12/2013 | Deng | G06F 3/0362 |
| | | | 345/163 |
| 2018/0275776 A1* | 9/2018 | Li | G06F 3/0362 |
| 2019/0094991 A1* | 3/2019 | Tsai | G06F 3/0362 |
| 2019/0121452 A1* | 4/2019 | Hsueh | G06F 3/03543 |

* cited by examiner

SCROLL WHEEL MODULE AND MOUSE

BACKGROUND OF THE INVENTION

The present invention pertains to the field of input devices; to be specific, it relates to a scroll wheel module used to generate signals in an input device, and further concerns a mouse.

Inputting data and information to a computer or an electronic device is like building a bridge across which the computer communicates with a user or other devices. An input device is one of main devices for information exchange between the user and a computer system. Keyboard, mouse, camera, scanner, light pen, handwriting input board, joystick, voice input device among others are all input devices. The input device is a device that enables a person or the outer world to interact with the computer and serves to input raw data and programs for processing these data into the computer. The computer can receive a variety of data, which may be numeric data or various non-numeric data. For example, graphics, images, sounds among others can be input into the computer through different types of input devices, and then stored, processed and output there.

A scroll wheel module is one of hardware modules that generate signals in input devices, and like buttons, has become a common component in existing input devices. The scroll wheel module is widely applied to mouses. Of course, a scroll wheel is not confined to the mouses, and can also be applied to other input devices to realize the interactive function of scroll wheel operations.

The existing scroll wheels mostly have fixed damping; one flip only triggers one roll; they cannot provide multi-layer flipping-triggered hand feel, nor can they be quickly flipped, thereby causing inconveniences in some office or game scenarios.

Therefore, ZL201910560652.3 "Multi-mode Scroll Wheel for Input Device" comes out, and can provide three operation modes: flywheel mode, constant friction mode, and ratchet mode, but the overly complex structure will greatly inflate the production costs of a mouse while increasing the weight of the mouse. Due to the complex structure, it has poor impact resistance and is prone to damage. In general, multi-mode mouses of this sort are switched by mechanical means, and will end up with a further increase in the complexity of the structure and a sharp rise in the production costs if electrical, electromechanical, or electromagnetic control is adopted.

BRIEF SUMMARY OF THE INVENTION

In view of the above problems, the present invention aims to provide a scroll wheel module that has a well-designed structure and enables the electronic-control switch of the hand feel and the magnitude of damping under control of programs.

To achieve the technical purpose, the solution of the present invention is: a scroll wheel module, which comprises a bracket and a rotatable scroll wheel that is arranged on the bracket, the scroll wheel being equipped with a hand feel member that provides flipping tactile, the scroll wheel module further comprising an electronic control adjustment assembly, which is used to adjust the magnitude of damping that the hand feel member exerts on the scroll wheel.

The scroll wheel has a ring structure, with an inner ring that is provided with an inner wall in a wavy or tooth-like structure; the hand feel member is a rigid frame, with a beam as well as a hand feel end and a tilting end that are located at both ends of the beam, respectively; the hand feel end extends into the inner ring of the scroll wheel and cooperates with the inner wall to provide flipping tactile; the tilting end cooperates with the electronic control adjustment assembly to move the hand feel end close to or away from the inner wall of the inner ring of the scroll wheel; the beam is pivotally connected to the bracket; the tilting end moves up and down as linkage such that the hand feel end is adhered to or separated from the inner wall of the inner ring of the scroll wheel.

The electronic control adjustment assembly comprises a slider assembly and a driving member that drives the slider assembly to move back and forth, and the slider assembly is provided with an elastic bump; when the slider assembly moves in such a way that the tilting end of the hand feel member is located on the elastic bump, the tilting end co-moves with the hand feel end to adhere to the inner wall of the inner ring of the scroll wheel, so as to provide tactile; when the slider assembly moves in such a way that the tilting end of the hand feel member departs from the elastic bump, the tilting end falls back and moves the hand feel end away from the inner wall of the inner ring of the scroll wheel.

Preferably, the driving member is a motor, on an output shaft of which a gear is mounted, the slider assembly is provided with a rack that matches the gear, and the forward and reverse rotation of the motor drives the slider assembly to move back and forth under control of programs.

Preferably, the driving member is a motor, on an output shaft of which a swinging member is mounted, and the forward and reverse rotation of the motor drives the swinging member to flip the slider assembly to move back and forth under control of programs.

Preferably, the driving member is an electromagnet, which drives the slider assembly to move back and forth under control of programs.

Preferably, the elastic bump is formed by combining a boss with a spring, the spring is arranged between the boss and the slider assembly, and the boss is mounted on the slider assembly in an embedded way.

Preferably, a plane where the boss of the elastic bump is in contact with the tilting end is an oblique plane.

Preferably, a bottom portion of the slider assembly located on a side of the elastic bump is further provided with a magnet, the tilting end is a magnet-attracted member, and can be attracted by the magnet to fall down when departing from the elastic bump, thereby moving the hand feel end away from the inner wall of the inner ring of the scroll wheel.

The present application also provides a mouse, which adopts the above solution of the scroll wheel module, and enables the electronic-control switch of the hand feel and the magnitude of damping under control of programs.

The beneficial effects of the present invention are: the innovative solution tactfully combines the electronic control adjustment assembly with the hand feel member, cart adjust the height of the tilting end simply and quickly by means of the electronic control adjustment assembly, further adjust the distance between the hand feel end of the hand feel member and the inner ring of the scroll wheel, and finally manage to adjust different kinds of tactile sense about damping while rolling the scroll wheel; moreover, under specific circumstances, it can keep the hand feel end out of touch with the inner ring of the scroll wheel, enter the flywheel state, and meet the needs in specific game modes; in the present application, the scroll wheel module is simple in structure, low in production costs, light in weight, solid and durable, and deserves promotion.

1. Bracket; 2. Scroll wheel; 21. Inner wall; 3. Hand feel member; 31. Beam; 32. Hand feel end; 33. Tilting end; 4. Electronic control adjustment assembly; 41. Slider assembly; 411. Rack; 42. Driving member; 421. Gear; 422. Swinging member; 43. Elastic bump; 431. Boss; 432. Spring; 44. Magnet.

DETAILED DESCRIPTION OF THE INVENTION

The present invention will be further elaborated below in combination with the drawings and specific embodiments.

As shown in FIGS. 1-8, the specific embodiments of the present invention relate to a scroll wheel module, which comprises a bracket 1 and a rotatable scroll wheel 2 that is arranged on the bracket 1; the scroll wheel 2 is equipped with a hand feel member 3 that provides flipping tactile; the scroll wheel module further comprises an electronic control adjustment assembly 4, which is used to adjust the magnitude of damping that the hand feel member 3 exerts on the scroll wheel 2. When receiving an instruction of a program or a designated button, the electronic control adjustment assembly can automatically adjust the position of the hand feel member, so that the hand feel member acts on the scroll wheel and generates damping different in magnitude, thereby realizing different kinds of tactile.

Figure 1:
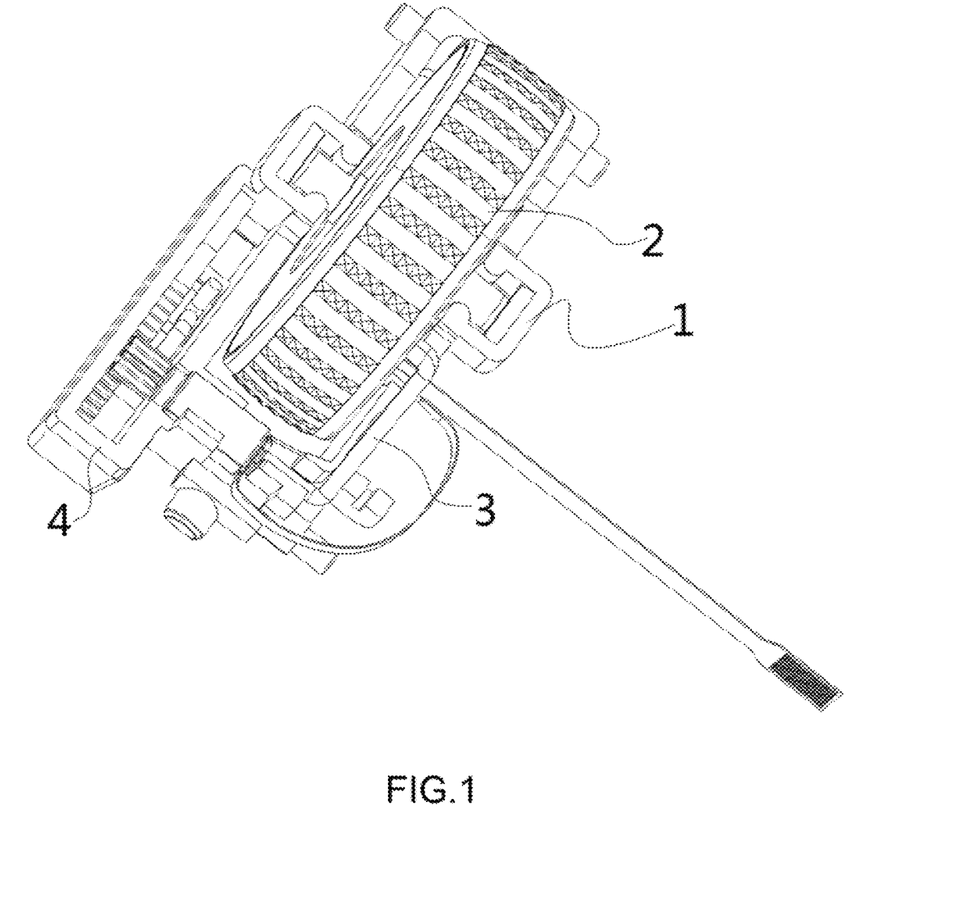
FIG. 1 is a structure diagram of the present invention.
Figure 2:
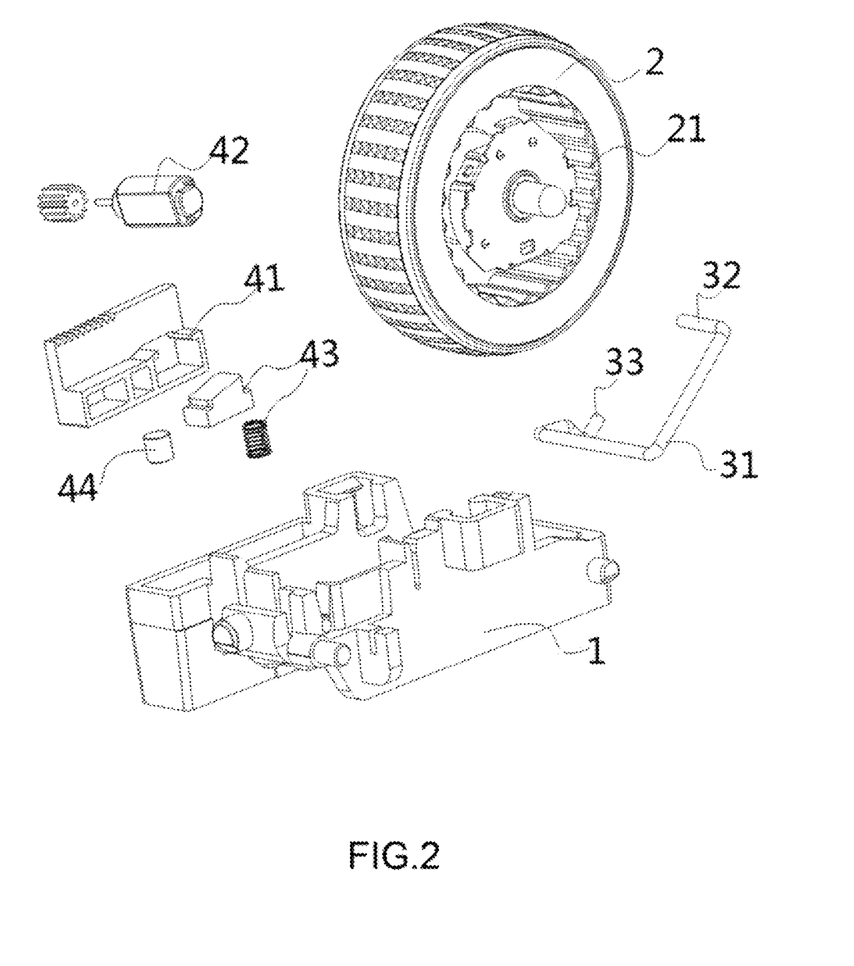
FIG. 2 is an exploded diagram of the present invention.

Specifically, the co-movement relationship between the electronic control adjustment assembly 4, the hand feel member 3, and the scroll wheel 2 is as follows: the scroll wheel 2 of the scroll wheel module has a ring structure, with an inner ring that is provided with an inner wall 21 in a wavy or tooth-like structure, for the purpose of cooperating with the hand feel end 32 to provide tactile while flipping the scroll wheel; the hand feel member 3 is a rigid frame, which will not be deformed when relative movement occurs between it and the scroll wheel; the hand feel member 3 has a beam 31 as well as a hand feel end 32 and a tilting end 33 that are located at both ends of the beam 31, respectively; the hand feel end 32 extends into the inner ring of the scroll wheel 2 and cooperates with the inner wall 21 to provide flipping tactile; the tilting end 33 cooperates with the electronic control adjustment assembly 4 to move the hand feel end close to or away from the inner wall 21 of the inner ring of the scroll wheel: the beam 31 is pivotally connected to the bracket 1, and the tilting end 33 moves up and down as linkage such that the hand feel end is adhered to or separated from the inner wall of the inner ring of the scroll wheel.

To enable the electronic control adjustment assembly to adhere to or separate from the scroll wheel, the electronic control adjustment assembly 4 comprises a slider assembly 41 and a driving member 42 that drives the slider assembly to move back and forth, and the slider assembly 41 is provided with an elastic bump 43; when the slider assembly 41 moves in such a way that the tilting end 33 of the hand feel member is located on the elastic bump 43, the tilting end 33 co-moves with the hand feel end to adhere to the inner wall of the inner ring of the scroll wheel, so as to provide tactile; when the slider assembly 41 moves in such a way that the tilting end 33 of the hand feel member departs from the elastic bump 43, the tilting end 33 falls back and moves the hand feel end 32 away from the inner wall of the inner ring of the scroll wheel. The driving member is controlled by a program or a designated button to move the slider assembly back and forth, so as to adjust the position of the tilting end on the slider assembly, and further adjust the magnitude of damping between the hand feel end and the scroll wheel, thereby achieving arbitrary adjustment of the hand feel change.

To drive the slider assembly 41 to move back and forth, the present invention comprises three embodiments as follows.

In combination with corresponding programs or designated buttons, the scroll wheel module of the present application can also facilitate quick control. For example, a designated button is set as a quick switch button, a single click on the button can switch options of different damping values, and long press can switch from the damping state to the flywheel state (at this moment, the hand feel end is not in contact with the inner ring of the scroll wheel, and there is only a slight resistance at the part of rotation shaft of the scroll wheel). Alternatively, the magnitude of damping is set and selected on a computer terminal through programs, and the quick control is realized by changing the position of the slider assembly. Alternatively, special trigger interaction conditions are set, the programs automatically make adjustment when the conditions are met; when the user flips the scroll wheel so quickly that the trigger interval or the number of consecutive triggers reaches a threshold value, the slider assembly moves in such a way that the hand feel end loses contact with the inner ring of the scroll wheel; at this moment, the entry into the flywheel state will occur automatically; in the flywheel state, if there is no rolling over a period of time or the number of rolling is less than the threshold value, the slider assembly moves in an opposite direction, so that the hand feel end comes close into contact with the inner ring of the scroll wheel; at this moment, the damping state is automatically resumed.

Figure 3:
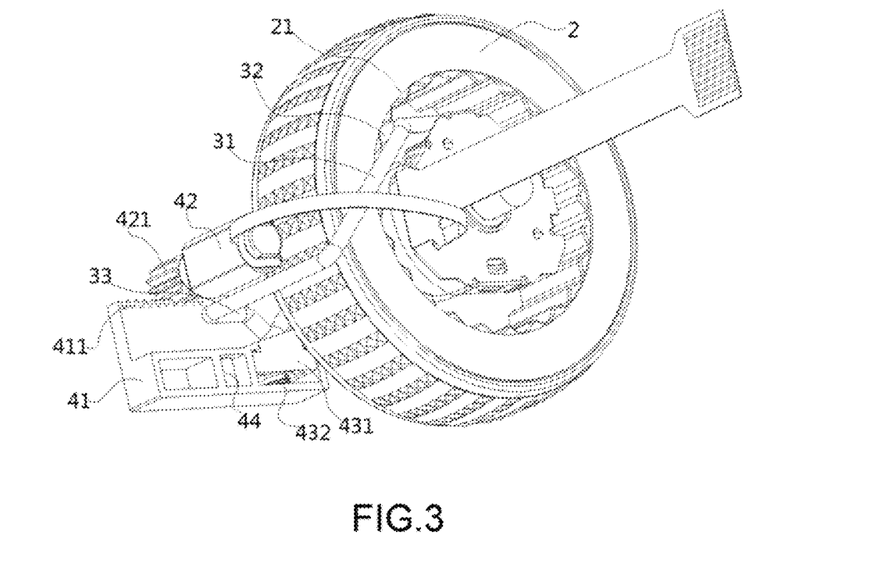
FIG. 3 is a state diagram of the hand feel end in contact with the scroll wheel according to Embodiment 1 of the present invention.
Figure 4:
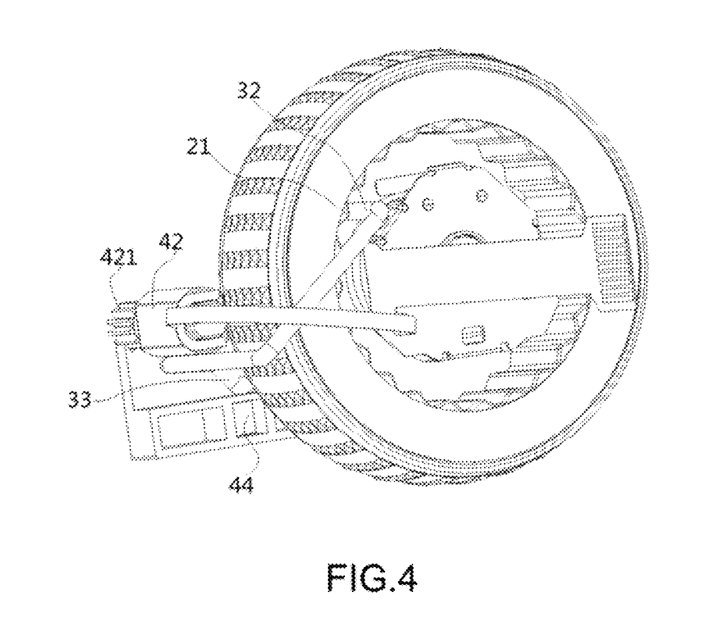
FIG. 4 is a state diagram of the hand feel end separating from the scroll wheel according to Embodiment 1 of the present invention.

As shown in FIGS. 3-4, Embodiment 1 of the present invention is as follows.

The driving member 42 is a motor. A gear 421 is mounted on an output shaft of the motor. The slider assembly 41 is provided with a rack 411 that matches the gear. The forward and reverse rotation of the motor drives the slider assembly 41 to move back and forth. When the tilting end is located on the elastic bump, the hand feel end is co-moved with the tilting end to adhere to the inner wall of the inner ring of the scroll wheel, thereby providing tactile; when the tilting end departs from the elastic bump, the tilting end falls back for co-movement such that the hand feel end 32 is separated from the inner wall of the inner ring of the scroll wheel; at this moment, the scroll wheel can be flipped quickly and unimpededly.

Figure 5:
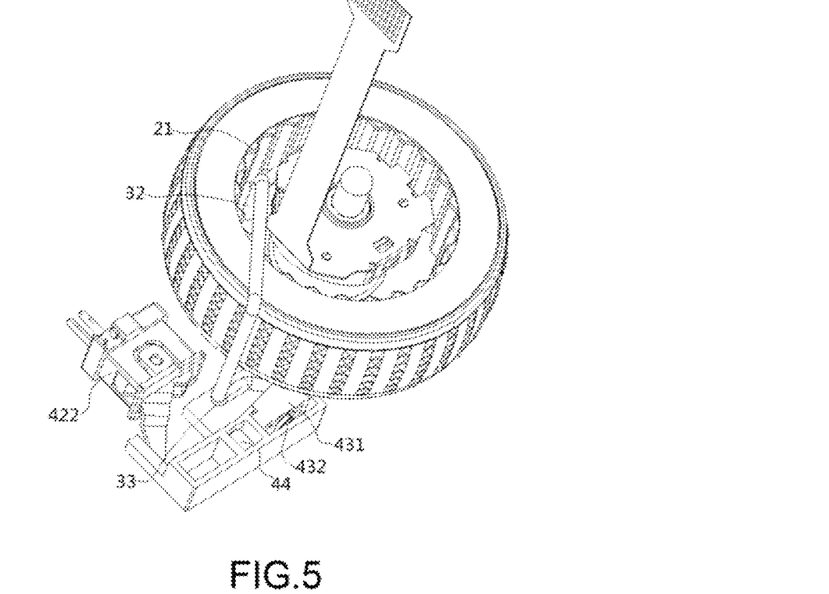
FIG. 5 is a state diagram of the hand feel end in contact with the scroll wheel according to Embodiment 2 of the present invention.
Figure 6:
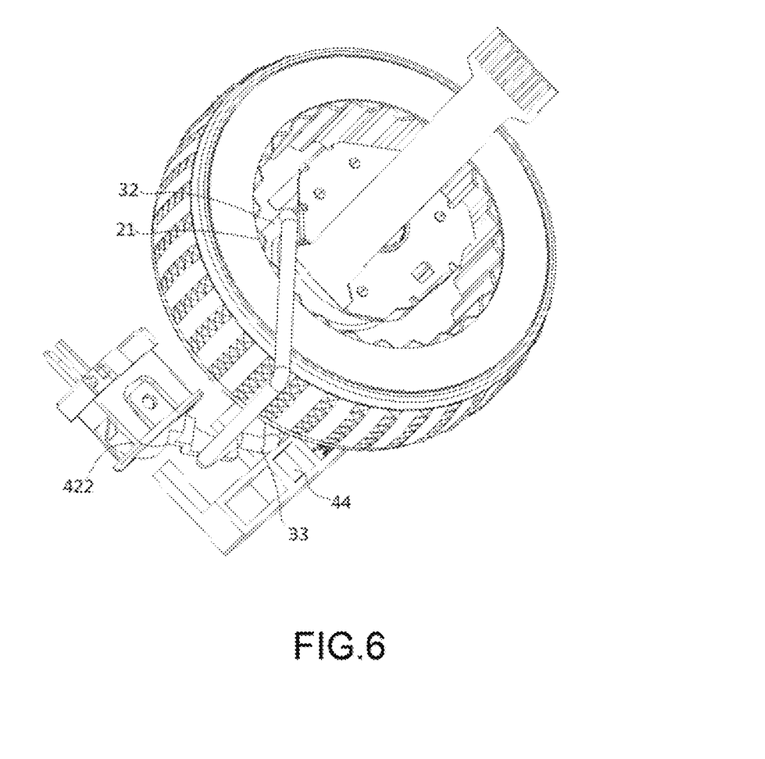
FIG. 6 is a state diagram of the hand feel end separating from the scroll wheel according to Embodiment 2 of the present invention.

As shown in FIGS. 5-6, Embodiment 2 of the present invention is as follows.

The driving member 42 is a motor. A swinging member 422 is mounted on an output shaft of the motor. The forward and reverse rotation of the motor drives the swinging member 422 to flip the slider assembly 41 to move back and forth. When the tilting end is located on the elastic bump, the hand feel end is co-moved with the tilting end to adhere to the inner wall of the inner ring of the scroll wheel, thereby providing tactile; when the tilting end departs from the elastic bump, the tilting end falls back for co-movement such that the hand feel end 32 is separated from the inner wall of the inner ring of the scroll wheel; at this moment, the scroll wheel can be flipped quickly and unimpededly.

Figure 7:
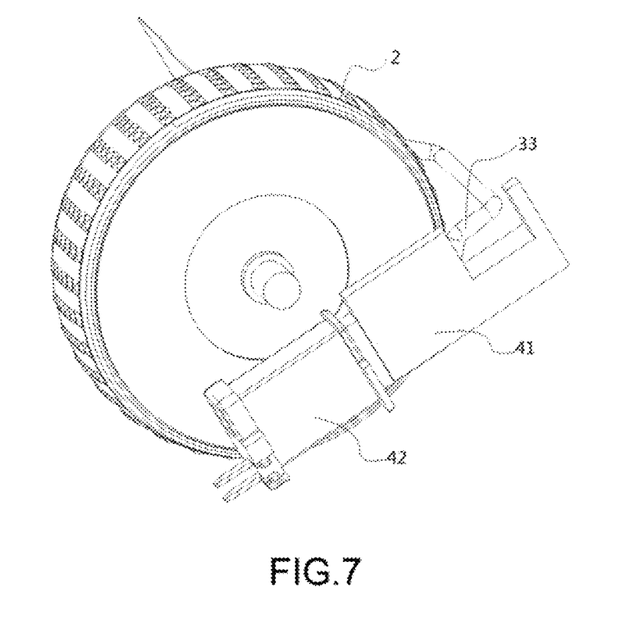
FIG. 7 is a state diagram of the hand feel end in contact with the scroll wheel according to Embodiment 3 of the present invention.
Figure 8:
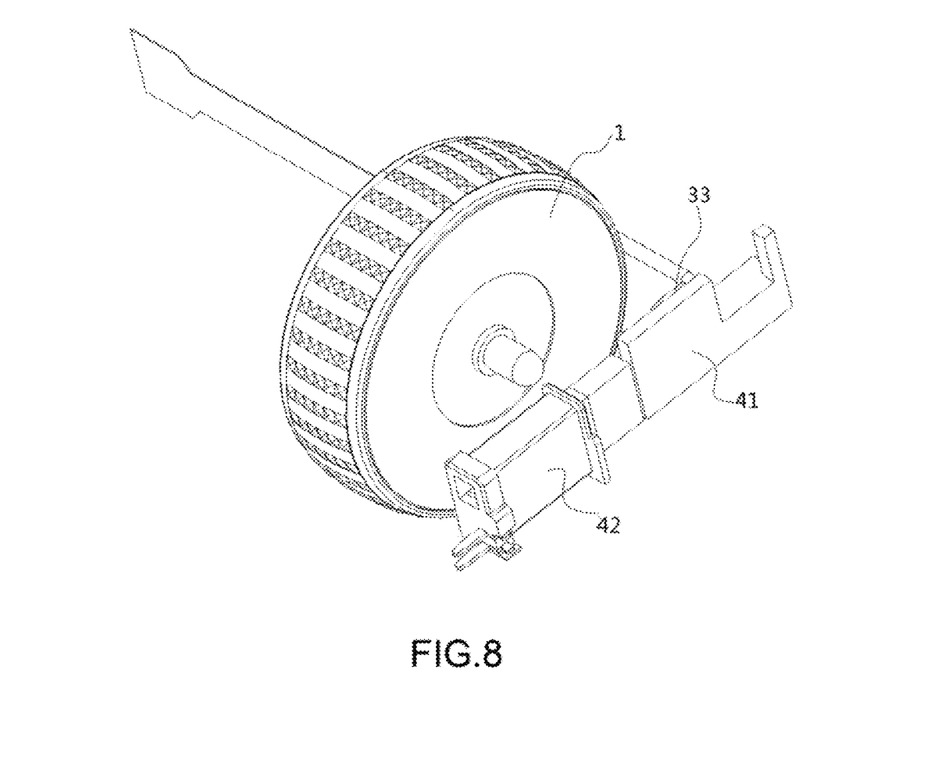
FIG. 8 is a state diagram of the hand feel end separating from the scroll wheel according to Embodiment 3 of the present invention.

As shown in FIGS. 7-8, Embodiment 3 of the present invention is as follows.

The driving member 42 is an electromagnet, which drives the slider assembly 41 to move back and forth. The electromagnet realizes attachment and detachment of the slider assembly by turning on and off the power, and the slider assembly moves back and forth accordingly. When the tilting end is located on the elastic bump, the hand feel end is co-moved with the tilting end to adhere to the inner wall of the inner ring of the scroll wheel, thereby providing tactile; when the tilting end departs from the elastic bump, the tilting end falls back for co-movement such that the hand feel end is separated from the inner wall of the inner ring of the scroll wheel; at this moment, the scroll wheel can be flipped quickly and unimpededly.

When the hand feel end is located at an upper end of the tooth-like or wavy inner wall of the inner ring of the scroll wheel, since the hand feel member is a rigid member, to enable the hand feel end to cross the upper end of the inner wall, the elastic bump 43 of the present application is formed by combining a boss 431 with a spring 432. The spring 432 is arranged between the boss 431 and the slider assembly 41, and the boss 431 is mounted on the slider assembly in an embedded way. The spring enables the tilting end to be reset on the boss in time, so as to prevent the entire hand feel member from jamming. The preferred solution of the boss of the scroll wheel is that the plane where the boss 431 of the elastic bump is in contact with the tilting end 33 is an oblique plane.

The tilting end can move left and right on the boss. When the tilting end is located at a different position on the oblique plane of the boss, the distance between the hand feel end and the inner ring of the scroll wheel is also different, and the force used to squeeze the inner ring of the scroll wheel to cross the hand feel end is also different, thereby bringing a different kind of tactile sense about damping and enriching the user experience. As shown in FIG. 3, for example, when the tilting end is at the highest point on the right side of the oblique plane of the boss, the hand feel end is closest to the inner ring of the scroll wheel, and while rolling, it takes a great force upon the tilting end to push down the spring to the greatest extent, thereby moving the hand feel end across the bump in the inner ring of the scroll wheel. On the contrary, as shown in FIG. 4, when the tilting end is located at the lowest point on the left side of the oblique plane of the boss, the hand feel end is far away from the inner ring of the scroll wheel, and while rolling, it only takes a small force upon the tilting end to press down the spring for a short distance, thereby moving the hand feel end across the bump in the inner ring of the scroll wheel.

As another preferred solution, the elastic bump can also adopt an elastic silica gel structure.

When departing from the slider assembly, the tilting end can automatically fall back under its own weight. As the optimal embodiment of the present application, a bottom portion of the slider assembly 41 located on a side of the elastic bump 43 is further provided with a magnet 44, the tilting end 33 is a magnet-attracted member, and can be attracted by the magnet to fall down when departing from the elastic bump 43, thereby moving the hand feel end 32 away from the inner wall of the inner ring of the scroll wheel. The addition of the magnet 44 can more firmly fix the tilting end at the same position, and keep the hand feel end away from the inner ring of the scroll wheel. When the scroll wheel is rotated, the hand feel end does not contact with the inner ring of the scroll wheel. At this moment, the scroll wheel can be quickly rotated in the flywheel state, which can meet the needs in specific game modes.

The present application further seeks protection for a mouse, which adopts the above scroll wheel module. Moreover, the scroll wheel is further provided with a grating, which is fixed on an inner side of the bracket, and can realize basic operations of the mouse. The scroll wheel module can also be applied in non-mouse fields, such as hand stick, controller, and other input devices, to realize the interactive function of scroll wheel operations.

By tactfully combining the electronic control adjustment assembly with the hand feel member, the present application can adjust the height of the tilting end simply and quickly by means of the electronic control adjustment assembly, further adjust the distance between the hand feel end of the hand feel member and the inner ring of the scroll wheel, and finally manage to adjust different kinds of tactile sense about damping while rolling the scroll wheel. Moreover, under specific circumstances, the present application can keep the hand feel end out of touch with the inner ring of the scroll wheel, enter the flywheel state, and meet the needs in specific game modes. In the present application, the scroll wheel module is simple in structure, low in production costs, light in weight, solid and durable, and deserves promotion.

The above are only preferred embodiments of the present invention and never serve to limit the present invention. Any minor modifications, equivalent substitutions and improvements that are made to the above embodiments on the basis of the technical essence of the present invention shall fall within the scope of protection of the technical solution of the present invention.

What is claimed is:

1. A scroll wheel module, which comprises a bracket and a scroll wheel that is arranged on the bracket and can be flipped, the scroll wheel being equipped with a hand feel member that provides flipping tactile, characterized in that the scroll wheel module further comprises an electronic control adjustment assembly, which adjusts magnitude of damping that the hand feel member exerts on the scroll wheel under control of programs; the scroll wheel has a ring structure, with an inner ring that is provided with an inner wall in a wavy or tooth-like structure; the hand feel member is a rigid frame, with a beam as well as a hand feel end and a tilting end that are located at both ends of the beam, respectively; the hand feel end extends into the inner ring of the scroll wheel and cooperates with the inner wall to provide flipping tactile; the tilting end cooperates with the electronic control adjustment assembly to move the hand feel end close to or away from the inner wall of the inner ring of the scroll wheel; the beam is pivotally connected to the bracket; the hand feel end co-moves with up-and-down movement of the tilting end to adhere to or separate from the inner wall of the inner ring of the scroll wheel; the electronic control adjustment assembly comprises a slider assembly and a driving member that drives the slider assembly to move back and forth, and the slider assembly is provided with an elastic bump; when the slider assembly moves in such a way that the tilting end of the hand feel member is located on the elastic bump, the tilting end co-moves with the hand feel end to adhere to the inner wall of the inner ring of the scroll wheel, so as to provide tactile; when the slider assembly moves in such a way that the tilting end of the hand feel member departs from the elastic bump, the tilting end falls back and moves the hand feel end away from the inner wall of the inner ring of the scroll wheel.

2. The scroll wheel module of claim 1, characterized in that the driving member is a motor, on an output shaft of which a gear is mounted, the slider assembly is provided with a rack that matches the gear, and the forward and reverse rotation of the motor drives the slider assembly to move back and forth under control of programs.

3. The scroll wheel module according to claim 1, characterized in that the driving member is a motor, on an output shaft of which a swinging member is mounted, and the forward and reverse rotation of the motor drives the swinging member to flip the slider assembly to move back and forth under control of programs.

4. The scroll wheel module according to claim 1, characterized in that the driving member is an electromagnet, which drives the slider assembly to move back and forth under control of programs.

5. The scroll wheel module according to claim 1, characterized in that the elastic bump is formed by combining a boss with a spring, the spring is arranged between the boss and the slider assembly, and the boss is mounted on the slider assembly in an embedded way.

6. The scroll wheel module according to claim 1, characterized in that a plane where the boss of the elastic bump is in contact with the tilting end is an oblique plane.

7. The scroll wheel module according to claim 1, characterized in that a bottom portion of the slider assembly located on a side of the elastic bump is further provided with a magnet, the tilting end is a magnet-attracted member, and can be attracted by the magnet to fall down when departing from the elastic bump, thereby moving the hand feel end away from the inner wall of the inner ring of the scroll wheel.

8. A mouse, characterized in that the mouse adopts the wheel module of claim 1.

* * * * *